United States Patent
Audhkhasi et al.

(10) Patent No.: US 11,158,303 B2
(45) Date of Patent: Oct. 26, 2021

(54) SOFT-FORGETTING FOR CONNECTIONIST TEMPORAL CLASSIFICATION BASED AUTOMATIC SPEECH RECOGNITION

(71) Applicant: International Business Machines Corporation, Armonk, NY (US)

(72) Inventors: Kartik Audhkhasi, White Plains, NY (US); George Andrei Saon, Stamford, CT (US); Zoltan Tueske, White Plains, NY (US); Brian E. D. Kingsbury, Cortlandt Manor, NY (US); Michael Alan Picheny, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 16/551,915

(22) Filed: Aug. 27, 2019

(65) Prior Publication Data

US 2021/0065680 A1 Mar. 4, 2021

(51) Int. Cl.
*G10L 15/06* (2013.01)
*G10L 15/05* (2013.01)
*G10L 15/16* (2006.01)

(52) U.S. Cl.
CPC ............ *G10L 15/063* (2013.01); *G10L 15/05* (2013.01); *G10L 15/16* (2013.01)

(58) Field of Classification Search
CPC ......... G10L 15/06; G10L 15/00; G10L 15/02; G10L 15/063; G10L 15/065; G10L 15/07;
(Continued)

(56) References Cited

U.S. PATENT DOCUMENTS 9,263,036 B1 2/2016 Graves
10,803,855 B1 * 10/2020 Rao .................... G10L 15/16
(Continued)

FOREIGN PATENT DOCUMENTS

WO 2018153200 A1 8/2018

OTHER PUBLICATIONS

Audhkhasi et al., "Forget a Bit to Learn Better: Soft Forgetting for CTC-based Automatic Speech Recognition", IBM Research AI, IBM T. J. Watson Research Center, Yorktown Heights, NY, 5 pages, printed on May 28, 2019.
(Continued)

*Primary Examiner* — Qi Han
(74) *Attorney, Agent, or Firm* — Randy E. Tejeda

(57) ABSTRACT

In an approach to soft-forgetting training, one or more computer processors train a first model utilizing one or more training batches wherein each training batch of the one or more training batches comprises one or more blocks of information. The one or more computer processors, responsive to a completion of the training of the first model, initiate a training of a second model utilizing the one or more training batches. The one or more computer processors jitter a random block size for each block of information for each of the one or more training batches for the second model. The one or more computer processors unroll the second model over one or more non-overlapping contiguous jittered blocks of information. The one or more computer processors, responsive to the unrolling of the second model, reduce overfitting for the second model by applying twin regularization.

19 Claims, 8 Drawing Sheets

(58) Field of Classification Search
CPC ..... G10L 15/075; G10L 15/08; G10L 15/144;
G10L 15/016; G10L 15/18; G10L 15/183;
G10L 15/20; G10L 15/26; G10L 2015/06;
G10L 2015/00; G10L 2015/02; G10L
2015/063; G10L 2015/0631; G10L
2015/0635; G10L 2015/08; G10L
2015/22; G10L 2015/225; G10L 2015/228
USPC .... 704/243, 232, 236, 250, 231, 255, 256.2,
704/256.8, 257
See application file for complete search history.

(56) References Cited

U.S. PATENT DOCUMENTS

| | | | |
|---|---|---|---|
| 10,964,309 B2* | 3/2021 | Li | G10L 15/04 |
| 2017/0148433 A1* | 5/2017 | Catanzaro | G10L 15/183 |
| 2017/0358293 A1* | 12/2017 | Chua | G10L 15/063 |
| 2018/0330718 A1 | 11/2018 | Hori | |
| 2018/0365560 A1 | 12/2018 | Qiao | |
| 2019/0122655 A1 | 4/2019 | Min | |
| 2019/0130271 A1 | 5/2019 | Narang | |

OTHER PUBLICATIONS

Battenberg et al., "Reducing Bias in Production Speech Models", Baidu Silicon Valley AI Lab, 1195 Bordeaux Avenue, Sunnyvale, CA, arXiv:1705.04400v1 [cs.CL] May 11, 2017, 10 pages.

Chen et al., "Training Deep Bidirectional LSTM Acoustic Model for LVCSR by a Context-Sensitive-Chunk BPTT Approach", Interspeech 2015, Copyright © 2015 ISCA, Sep. 6-10, 2015, Dresden, Germany, 5 pages.

Moritz, et al., "Triggered Attention for End-to-end Speech Recognition," IEEE International Conference on Acoustics, Speech and Signal Processing (ICASSP), pp. 5666-5670, 2019.

Povey et al., "Purely sequence-trained neural networks for ASR based on lattice-free MMI", 5 pages, printed on May 28, 2019.

Ravanelli et al., "The PyTorch-Kaldi Speech Recognition Toolkit," IEEE International Conference on Acoustics, Speech and Signal Processing (ICASSP), pp. 6465-6469, IEEE, Feb. 15, 2019.

Saon et al., "Sequence Noise Injected Training for End-To-End Speech Recognition", IBM Research AI, Yorktown Heights, USA, © 2019 IEEE, ICASSP 2019, 5 pages.

Srivastava et al., "Dropout: A Simple Way to Prevent Neural Networks from Overfitting", Journal of Machine Learning Research 15 (2014) 1929-1958, Submitted Nov. 2013; Published Jun. 2014, 30 pages.

Wang et al., "Lookahead Convolution Layer for Unidirectional Recurrent Neural Networks", Workshop track—ICLR 2016, Baidu Research, Silicon Valley Artificial Intelligence Lab, Sunnyvale, CA, 4 pages.

* cited by examiner

| Model | SWB | CH |
|---|---|---|
| Baseline | | |
| Whole-utterance BLSTM | 12.0 | 21.8 |
| + seq noise | 10.9 | 21.3 |
| Soft forgetting | | |
| Chunk-based BLSTM (C = 40) | 12.7 | 22.5 |
| + chunk size jitter (A = 2) | 12.1 | 21.5 |
| + twin reg (λ = 0.01) | 11.1 | 19.7 |
| + seq noise | 10.6 | 19.5 |

| Model | SWB | CH | RT02 | RT03 | RT04 | Avg |
|---|---|---|---|---|---|---|
| SI | | | | | | |
| Baseline | 10.9 | 21.3 | 19.3 | 19.2 | 17.1 | 17.6 |
| Soft forgetting | 10.6 | 19.5 | 18.0 | 17.2 | 16.2 | 16.3 |
| SA | | | | | | |
| Baseline | 10.6 | 19.7 | 18.1 | 17.1 | 15.9 | 16.3 |
| Soft forgetting | 9.7 | 18.1 | 16.4 | 15.6 | 14.6 | 14.9 |

| Model | LM | Label | SWB | CH |
|---|---|---|---|---|
| Hybrid | | | | |
| LF MMI✶ [34] | 4-gm | CD states | 9.6 | 9.3 |
| SA BLSTM (ours) | 4-gm | CD states | 9.6 | 16.8 |
| + sMBR | 4-gm | CD states | 8.8 | 16.5 |
| + LSTM LM | LSTM | CD states | 7.8 | 15.5 |
| End-to-End | | | | |
| EE LF MMI✶ [35] | 4-gm | Biphones | 10.9 | 20.6 |
| +RNN LM | RNN | Biphones | 9.3 | 18.9 |
| Attention✶ [36] | None | Characters | 12.2 | 23.3 |
| Attention [37] | LSTM | BPE-1K† | 11.8 | 25.7 |
| Attention [20] | LSTM | BPE-600† | 10.0 | 21.7 |
| CTC [20] | 4-gm | Phones | 11.0 | 20.5 |
| Soft forgetting | | | | |
| CTC SI | 4-gm | Phones | 10.6 | 9.5 |
| + sMBR | 4-gm | Phones | 10.2 | 18.5 |
| + LSTM LM | LSTM | Phones | 9.6 | 17.7 |
| Speed Perturb✶ | 4-gm | Phones | 9.9 | 18.7 |
| + sMBR | 4-gm | Phones | 9.7 | 18.1 |
| + LSTM LM | LSTM | Phones | 9.1 | 17.4 |
| CTC SA | 4-gm | Phones | 9.7 | 18.1 |
| + sMBR | 4-gm | Phones | 9.4 | 17.6 |
| + LSTM LM | LSTM | Phones | 8.7 | 16.8 |

FIG. 3D

SOFT-FORGETTING FOR CONNECTIONIST TEMPORAL CLASSIFICATION BASED AUTOMATIC SPEECH RECOGNITION

BACKGROUND

The present invention relates generally to the field of machine learning, and more particularly to automatic speech recognition.

End-to-end (E2E) automatic speech recognition (ASR) systems have been the subject of significant research. Such systems aim to simplify the complex training and inference pipelines of conventional hybrid ASR systems. Hybrid systems combine Gaussian mixture models, hidden Markov models (HMMs), various neural networks and involve multiple stages of model building and alignment between the sequence of speech features and HMM context-dependent states. In contrast, E2E systems use recurrent neural networks and train the acoustic model in one-shot by either summing over all alignments through the connectionist temporal classification loss or learning the optimal alignment through an attention mechanism.

A recurrent neural network (RNN) is a class of artificial neural network where connections between nodes form a directed graph along a sequence allowing the network to exhibit temporal dynamic behavior for a time sequence. Unlike feedforward neural networks, RNNs can use internal states (memory) to process sequences of inputs allowing the RNN to be applicable to tasks such as unsegmented connected handwriting recognition or speech recognition. Long short-term memory (LSTM) units are alternative layer units of a recurrent neural network (RNN). An RNN composed of LSTM units is referred as a LSTM network. A common LSTM unit is composed of a cell, input gate, output gate, and forget gate. The cell remembers values over arbitrary time intervals and the gates regulate the flow of information into and out of the cell. Gated recurrent units (GRUs) are a gating mechanism in recurrent neural networks. GRU performance on polyphonic music modeling and speech signal modeling was found to be similar to LSTM. However, GRUs exhibit better performance on smaller datasets. LSTMs can be bidirectional (BLSTM) consisting of two LSTM networks where each contained layer is unrolled forward and backward in time. For E2E ASR systems, the BLSTM can be unrolled over the entire length of the speech utterance, enabling a BLSTM to better capture long-term context, which is especially useful given a lack of alignments.

Connectionist temporal classification (CTC) is a type of neural network output and associated scoring function, commonly utilized for training RNNs such as LSTM networks to tackle sequence problems where the time alignment between input and output sequences is not known a priori (e.g., online handwriting recognition or recognizing phonemes in speech audio). CTC is independent of the underlying neural network structure. The output labels of the CTC network include an additional "blank" or garbage symbol that consumes points of the input sequence that do not align to the output sequence. A CTC network has a continuous output (e.g. softmax), which is fitted through training to model the probability of a label. CTC scores can be used with backpropagation to update neural network weights.

SUMMARY

Embodiments of the present invention disclose a computer-implemented method, a computer program product, and a system for soft-forgetting training. The computer-implemented method includes one or more computer processors training a first model utilizing one or more training batches wherein each training batch of the one or more training batches comprises one or more blocks of information. The one or more computer processors, responsive to a completion of the training of the first model, initiate a training of a second model utilizing the one or more training batches. The one or more computer processors jitter a random block size for each block of information for each of the one or more training batches for the second model. The one or more computer processors unroll the second model over one or more non-overlapping contiguous jittered blocks of information. The one or more computer processors, responsive to the unrolling of the second model, reduce overfitting for the second model by applying twin regularization.

BRIEF DESCRIPTION OF THE DRAWINGS

FIG. 3D illustrates exemplary table 340, an example table depicting word error rates for a plurality of models, in accordance with an embodiment of the present invention;

DETAILED DESCRIPTION

Connectionist temporal classification (CTC)-based automatic speech recognition systems (ASR) are commonly utilized when machine translating acoustic sequences into respective phenomes. CTC-based automatic speech recognition systems perform well when using bidirectional long short-term memory (BLSTM) networks unrolled over a whole speech utterance. However, unidirectional long short-term memory (ULSTM) networks traditionally lag behind BLSTM networks due to ULSTM only incorporating forward-in-time contexts, whereas BLSTM networks additionally incorporate backward-in-time contexts. Although BLSTM networks commonly perform well for said tasks, strict BLSTM networks lead to significant overfitting issues and, subsequent, increased error rates and reduced generalization applicability.

Embodiments of the present invention allow utilizing soft-forgetting training to significantly increase classification accuracy and reduction word error rates without significant alterations to the underlying networks. In an embodiment of the present invention, the BLSTM is unrolled only over small non-overlapping blocks of information or chunks of the input utterance or acoustic sequence, reducing overfitting. In another embodiment of the present invention, the chunk size for each batch is randomly assigned instead of a fixed global chunk value, improving generalization performance. In yet another embodiment of the present invention, twin regularization is applied utilizing the mean-squared error between a trained whole-utterance BLSTM and a soft-forgetting BLSTM, retaining utterance-level contextual information. Said embodiments significantly improve both offline/non-streaming and streaming word error rates of CTC ASR systems. Implementation of embodiments of the invention may take a variety of forms, and exemplary implementation details are discussed subsequently with reference to the Figures.

The present invention will now be described in detail with reference to the Figures.

Figure 1:
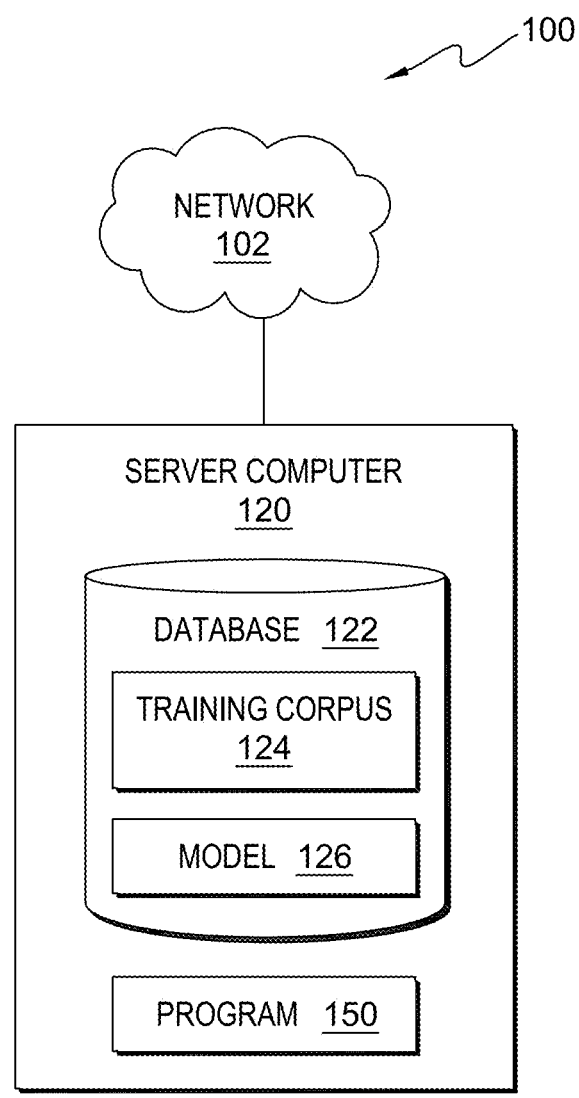
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected to network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120 and computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted and described in further detail with respect to FIG. 4.

Database 122 is a repository for data used by program 150. In the depicted embodiment, database 122 resides on server computer 120. In another embodiment, database 122 may reside on computing device 110 or elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as training sets, label distribution data and charts, and historical model accuracy and performance statistics. In the depicted embodiment, database 122 contains training corpus 124 and cognitive model 126.

Training corpus 124 may contain one or more sets of one or more instances of classified (e.g., labelled) data, hereinafter referred to as training statements. In an embodiment, each training set includes a label (e.g., string, textual sequence, characters, etc.) and an associated array or set of training statements which can be utilized to train one or more models. In a further embodiment, training corpus 124 contains vectorized (i.e., one-hot encoding, word embedded, dimension reduced, etc.) training sets and associated training statements. In various embodiments, training corpus 124 contains complete or partial utterances either in auditory or written forms. In this embodiment, the utterances are continuous sequences of audio feature vectors.

Model 126 utilizes one or more cognitive models to classify one or more problem instances (e.g., natural language statements, test statements, utterances, continuous time-stepped data, etc.). In an embodiment, model 126 utilizes transferrable neural networks algorithms and models (e.g., long short-term memory (LSTM), bidirectional long short-term memory (BLSTM), deep stacking network (DSN), deep belief network (DBN), convolutional neural networks (CNN), recurrent neural network (RNN), compound hierarchical deep models, etc.). In the depicted embodiment, model 126 utilizes one or more BLSTMs. In a further embodiment, said BLSTM is trained utilizing supervised training methods that feed vectorized training sets of feature data to model 126. In various embodiments, the features are labelled with an associated class enabling model 126 to learn what features are correlated to a specific class, prior to use. Model 126 is trained to recognize the differences between labels or classes. Model 126 utilizes training sets to generate a set of probabilities denoting the probability of a problem instance (e.g., utterance, etc.) belonging to a particular label or class. In this embodiment, model 126 classifies (e.g., labels) a problem instance (e.g., problem, training vectors or statements, etc.) by considering different features, available as structured or unstructured data. In an embodiment, model 126 inputs sequences (e.g., vectors) of audio features and outputs phonetic labels for each sequence. The training of model 126 is depicted and described in further detail with respect to FIG. 2.

Program 150 trains one or more models utilizing soft-forgetting. In various embodiments, program 150 may implement the following steps. Program 150 initiates after a receiving a training request for one or more models. In an embodiment, program 150 initiates after receiving or retrieving one or more training sets. Program 150 retrieves a set of training data. Program 150 trains one or more whole-utterance bidirectional long short-term memory networks. Program 150 commences training one or more soft-forgetting bidirectional long short-term memory networks. Program 150 continues the training process by unrolling the one or more soft-forgetting bidirectional long short-term memory networks. Program 150 jitters the chunk size of the one or more soft-forgetting bidirectional long short-term memory networks. Program 150 utilizes the one or more trained whole-utterance bidirectional long short-term memory networks in the twin regularization of the one or more soft-forgetting bidirectional long short-term memory networks. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on computing device (not depicted) within computational environment 100. Program 150 is depicted and described in further detail with respect to FIG. 2.

The present invention may contain various accessible data sources, such as database 122, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 enables the authorized and secure processing of personal data. Program 150 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Program 150 provides information regarding personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
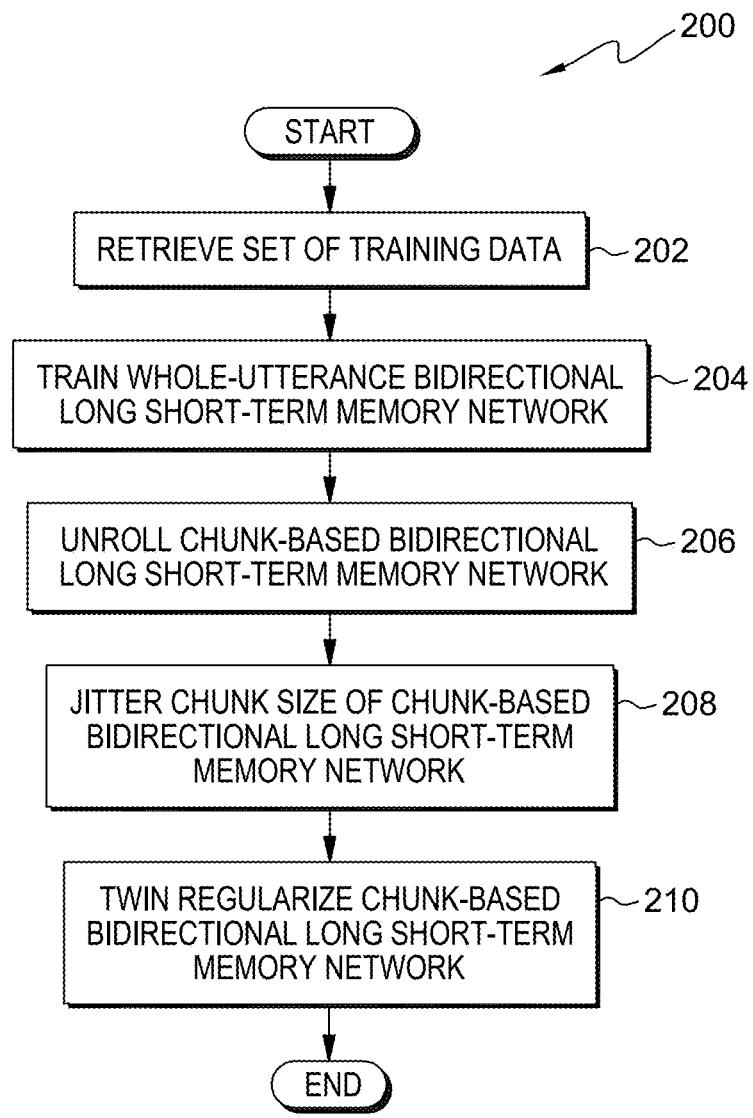
FIG. 2 is a flowchart depicting operational steps of a soft-forgetting training program, on a server computer within the computational environment of FIG. 1, in accordance with an embodiment of the present invention.

FIG. 2 is a flowchart depicting operational steps of program 150 for soft-forget training a model, in accordance with an embodiment of the present invention.

Program 150 retrieves a set of training data (step 202). In an embodiment, program 150 retrieves a plurality of utterances, acoustic sequences, and/or statements associated with a training set. In an example, program 150 utilizes the 300-hour English Switchboard (SWB) dataset as the set of training data and program 150 trains one or more speaker independent (SI) and speaker adapted (SA) models utilizing said training data. In this example embodiment, the SI models used 40-dimensional logMel features with a per-speaker cepstral mean subtraction (CMS) without any vocal tract normalization (VTLN). The SA models used 40-dimensional logMel features with per-speaker CMS and VLTN, 40-dimensional feature-space maximum likelihood linear regression (FMLLR) features, and 100-dimensional i-vectors. In another embodiment, program 150 processes the retrieved set of training data (e.g., utterances, acoustic sequences, etc.) into multiple subsets (e.g., chunks, blocks of information). In yet another embodiment, program 150 partitions historical utterances into discrete sets containing differently processed versions of the same utterance. In various embodiments, program 150 defines the bounds of an utterance by utilizing predetermined utterance intervals. In this embodiment, program 150 partitions the utterances into one or more sets defined by temporal constraints. In an embodiment, program 150 vectorizes the sets of training data and partitioned utterance/label sets. In various embodiments, program 150 segments the training data into one or more training batches containing a subset of the training data. In this embodiment, program 150 may randomly create the batches or program 150 may receive the batch size from the user.

Program 150 trains whole-utterance bidirectional long short-term memory network (step 204). Program 150 utilizes the retrieved sets of training data, detailed in step 202, to train one or more whole-utterance BLSTMs (e.g., first set of models). In an embodiment, program 150 performs supervised training with the labeled vectorized training data. For example, program 150 feeds utterance/label pairs into model 126, allowing program 150 to make inferences between the training data (e.g., utterances) and the classification data (i.e., label). In an embodiment, program 150 determines whether sufficient precision is obtained by utilizing test sets. The BLSTM processes sequential data ($x_1$, $x_2 \ldots, x_t$) to calculate subsequent hidden states while the parameters of the model remain the same. In an example, program 150 trains a 6-layer BLSTM network with 512 hidden neurons in each forward and backward direction. In a further example, the 6-layer BLSTM outputs a 1024-dimensional hidden vector mapped to a 45-dimensional posterior probability vectors representing the 44 phonemes and the blank symbol through a linear layer and softmax layer. In various embodiments, supervised training determines the difference between a prediction and a target (i.e., the error), and back-propagates the difference through the layers such that the model/network "learns." In an embodiment, program 150 utilizes stochastic gradient algorithms such as synchronous stochastic gradient descent (SGD) to implement backpropagation. In an embodiment, program 150 utilizes the following as a loss function:

$$L_{tot}(y|x,\Theta_f,\Theta_b) = L_{CTC\text{-}f}(y|x,\Theta_f) + L_{CTC\text{-}b}(y|x,\Theta_b) + \lambda L_{twin}(h_f,h_b|\Theta_f,\Theta_b) \quad (1)$$

With respect to equation (1), the twin regularization loss is the mean-squared error between the LSTM hidden representations $h_f$ and $h_b$. $\Theta_f$ and $\Theta_b$, denote the parameters of the forward and backward ULSTM networks, respectively, x and y are the input acoustic and output label sequences, and $\lambda > 0$ as a scaling factor.

Program 150 may modify the learning rate in order to adjust CTC or cross-entropy cost, allowing program 150 to increase or decrease the adaptability of related cells and layers. For example, program 150 utilizes a learning rate of 0.04, Nesterov momentum of 0.9, and a batch size of 128. Program 150 modifies said learning rate by √0.05 per epoch after the first 10 epochs. In an embodiment, program 150 adds sequence noise injection which performs long-sum-exp on the logMel feature sequences of the current utterance and a randomly sampled utterance from the set of training data contained within training corpus 124. In another embodiment, program 150 utilizes two hyperparameter weights on the features of the randomly sampled utterance and the probability of injecting sequence noise. In an example, program 150 utilizes values of 0.4 for the hyperparameters of the SI models and 0.2/0.4 for the hyperparameters of the SA model based on calculated held-out CTC loss. In various embodiment, program 150 retains the weights of the whole-utterance BLSTM fixed during training.

Program 150 unrolls chunk-based bidirectional long short-term memory network (step 206). Program 150 initiates the soft-forgetting training of one or more chunk-based BLSTM networks (e.g., second set of models). Program 150 concurrently trains, and unrolls one or more chunk-based BLSTMs, taking the previous hidden state and input at that time step to generate the input for the next series of time steps, allowing information to flow through the network, so that the last cell includes information derived from all the previous cells. Program 150 identifies one or more non-overlapping windows of C contiguous time steps of an input acoustic sequence (e.g., utterance). In an embodiment, program 150 only unrolls the one or more chunk-based BLSTMs over the identified non-overlapping windows of C contiguous time steps of the input acoustic sequence. Traditionally, whole-utterance (e.g., no soft-forgetting) BLSTMs overfit training data especially when training data is limited. In another embodiment, program 150 set the hidden states and cell states to zero after every C time step. In this embodiment, C is empirically calculated from the held-out (e.g., test utterance) CTC loss. In an example, chunk size may range from 5 to 50 stacked frames (100 milliseconds to 1 second) in steps of five stacked frames.

Program 150 jitters chunk size of chunk-based bidirectional long short-term memory network (step 208). Program 150 utilizes the sets of training data, as described in step 202, and the training techniques utilized in step 204 to train one or more chunk-based BLSTMs, as referenced in step 206. In an embodiment, program 150 splits each training sequence into short chunks or blocks (e.g., duration) with appended contextual observations. In various embodiments, program 150 perturbs C from one training batch to the next. Said perturbance improves the generalization performance of the model. In an embodiment, program 150 perturbs C by adding jitter to the chunk size to each batch during training. In various embodiments, program 150 randomly assigns (e.g., perturbs, jitter) the chunk size. In this embodiment, C is randomly assigned between batches in training. In an example, program 150 jitters the chunk size $C_{batch}$ of each batch as follows: $C_{batch}=C+u$, where $u \sim U(-A, A)$ is a uniformly discrete random variable over $[-A, A]$. Continuing from said example, program 150 jittering between the interval $U(-2, 2)$ across training batches. In this example, program 150 selects a chunk size of 40 stacked frames. In a further embodiment, program 150 empirically calculates A from the held-out (e.g., test or validation set of utterances) CTC loss.

Program 150 applies twin regularization to chunk-based bidirectional long short-term memory network (step 210). Twin regularization adds a regularization term that forces forward hidden states to be as close as possible to cotemporally backward ones, computed by a twin network (e.g., whole-utterance BLSTM) running backwards in time. In addition to the CTC loss, program 150 adds twin regularization loss to the training one or more chunk-based BLSTMs. In an embodiment, the twin regularization loss is the mean-squared error between the hidden states of the trained whole-utterance BLSTM network, as described in step 204. The overall loss function for soft-forgetting is as follows:

$$L_{tot}(y|x,\Theta)=L_{CTC}(y|x,\Theta)+\lambda L_{twin}(h,h_{whole}|\Theta) \quad (2)$$

With respect to equation (2), $L_{tot}$ corresponds to summation of the CTC loss and the twin regularization loss utilizing the whole-utterance BLSTM. Setting λ to zero results in hard-forgetting, where hidden or cell state information is not transferred across chunks. In an embodiment, program 150 sets λ to a non-zero value, significantly improving the word error rate (WER) when compared to λ with zero values (e.g., hard-forgetting). In this embodiment, soft-forgetting retains some of the whole-utterance context through twin regularization. The weights of the whole-utterance BLSTM remained fixed during the training process. In various embodiments, once a chunk-based BLSTM network completes training, program 150 discards (e.g., dispose, eliminate, delete, etc.) the whole-utterance BLSTM network and performs interference without any modification.

In various embodiments, once a soft-forgetting BLSTM network completes training, program 150 discards the whole-utterance BLSTM network and performs interference without any modification. In an embodiment, program 150 transmits and/or installs one or more soft-forgetting BLSTMs to a production environment or server. In various embodiments, program 150 may select multiple soft-forgetting BLSTMs and deploy the models to the same production environment or deploy the models to a plurality of respective production, test, or auxiliary environments. In an embodiment, program 150 hosts (e.g., allows access and utilization) one or more trained soft-forgetting BLSTMs, allowing applications and programs (not depicted) access to the model. In this embodiment, said applications and programs may feed inputs into said trained soft-forgetting BLSTMs and may receive or request the associated output.

Accordingly, by performing the operational steps of FIG. 2, program 150 trains one or more soft-forgetting BLSTMs. Program 150 trains (e.g., pre-trains) one or more whole-utterance BLSTMs. Program 150 initiates the training of one or more soft-forgetting BLSTMs by initializing one or more chunk-based BLSTMs. In this embodiment, soft-forgetting BLSTMs reduce the overfitting issues caused by whole-utterance BLSTMs. Program 150 adds jitter (e.g., randomness) the chunk size, improving the generalization performance of the model. In this embodiment, jittering the chunk size prevents the model memorization of the fixed-sized chunk. Program 150 applies twin regularization and CTC loss, utilizing the trained whole-utterance BLSTM, allowing the retention of utterance-level contextual information.

Figure 3A:
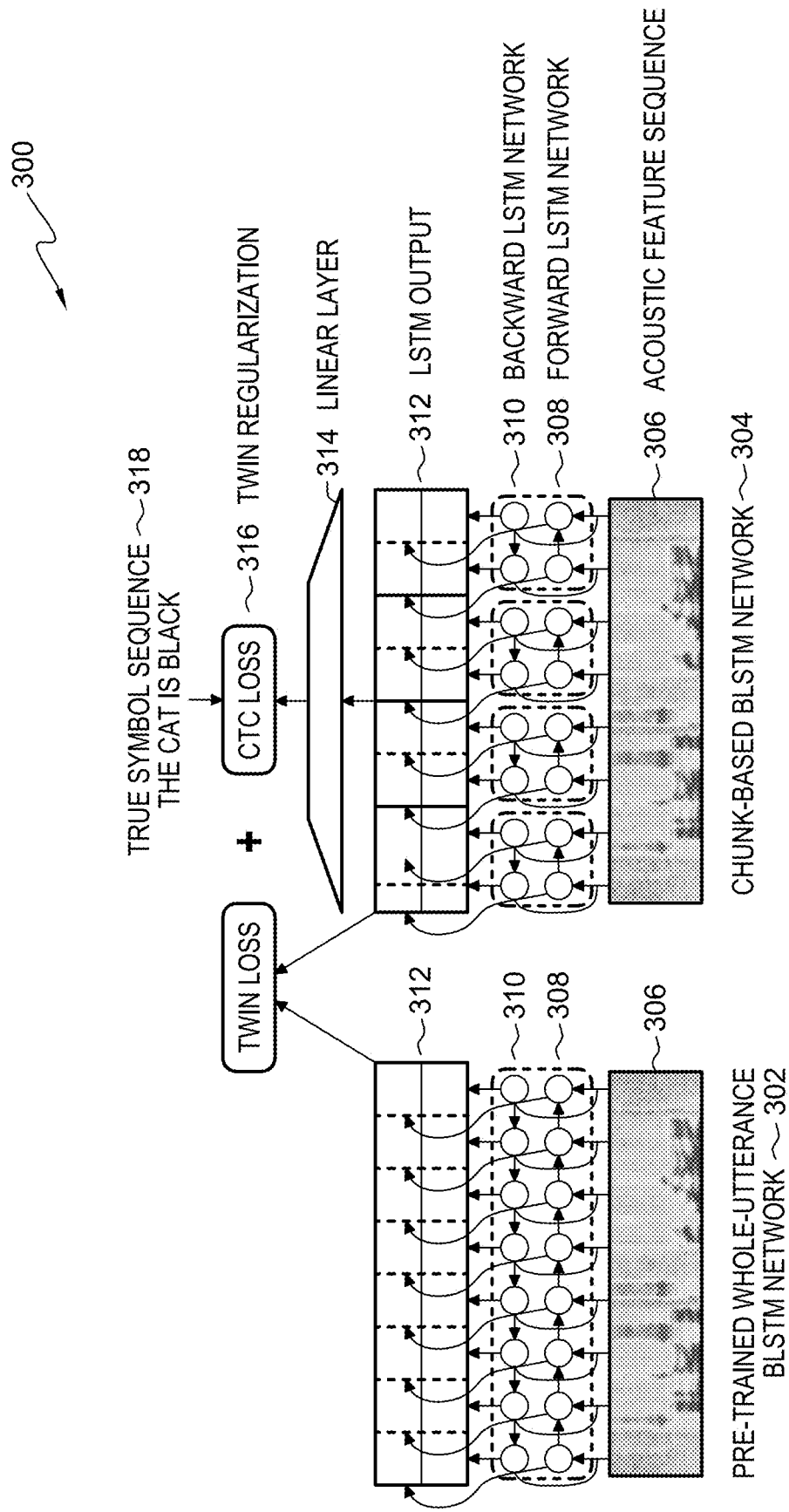
FIG. 3A illustrates exemplary FIG. 300, an example figure of the steps of flowchart 200, in accordance with an embodiment of the present invention.

FIG. 3A illustrates exemplary FIG. 300 which is an example illustration of the soft-forgetting training process. Exemplary FIG. 300 includes pre-trained whole-utterance BLSTM network 302, which is an exemplary BLSTM trained without soft-forgetting, chunk-based BLSTM network 304, which is an exemplary BLSTM trained with soft-forgetting, acoustic feature sequence 306, which is an utterance represented as a spectrogram, forward LSTM network 308, which is a component of a BLSTM network, backward LSTM network 310, which is a component of a BLSTM network, LSTM output 312, which is a layer contained the outputs of the preceding network, linear layer 314, which is an adaptive layer that is modified to conform with changes between inputs and outputs, twin regularization 316, which is illustrative of the procedure described in step 210, true symbol sequence 318, which is the symbolic equivalent of the acoustic feature sequence 306.

Figure 3B:
FIG. 3B illustrates exemplary table 320, an example table depicting word error rates for a baseline model and a soft-forgetting model, in accordance with an embodiment of the present invention.

FIG. 3B illustrates exemplary table 320, which is a table depicting the word error rates (WER) for one or more whole-utterance and soft-forgetting BLSTMs trained with Hub5-2000 Switchboard (SWB) and CallHome (CH) training sets. Example table 320 demonstrates that the whole-utterance trained networks overfit while the soft-forgetting trained (e.g., chunk-based) networks do not overfit.

Figure 3C:
FIG. 3C illustrates exemplary table 330, an example table depicting word error rates for a baseline model and a soft-forgetting model, in accordance with an embodiment of the present invention.

FIG. 3C illustrates exemplary table 330, which is a table depicting word error rates (WER) for a set of speaker-independent and speaker-adaptive models, each containing a baseline model (e.g., whole-utterance BLSTM) and a soft-forgetting model (e.g., chunk-based BLSTM) trained with Hub5-2000 Switchboard (SWB), CallHome (CH), RT02, RT03, and RT04 training sets. Example table 330 demonstrates a 0.9% and 1.6% absolute improvement for soft-forgetting models over respective baseline models.

FIG. 3D illustrates exemplary table 340, an example chart depicting word error rates for a plurality of traditional models trained with Hub5-2000 Switchboard (SWB) and CallHome (CH) training sets. Models denoted with a "*" symbol utilized speed perturbation and models denoted with a "+" symbol utilized byte pair encoding.

Figure 3E:
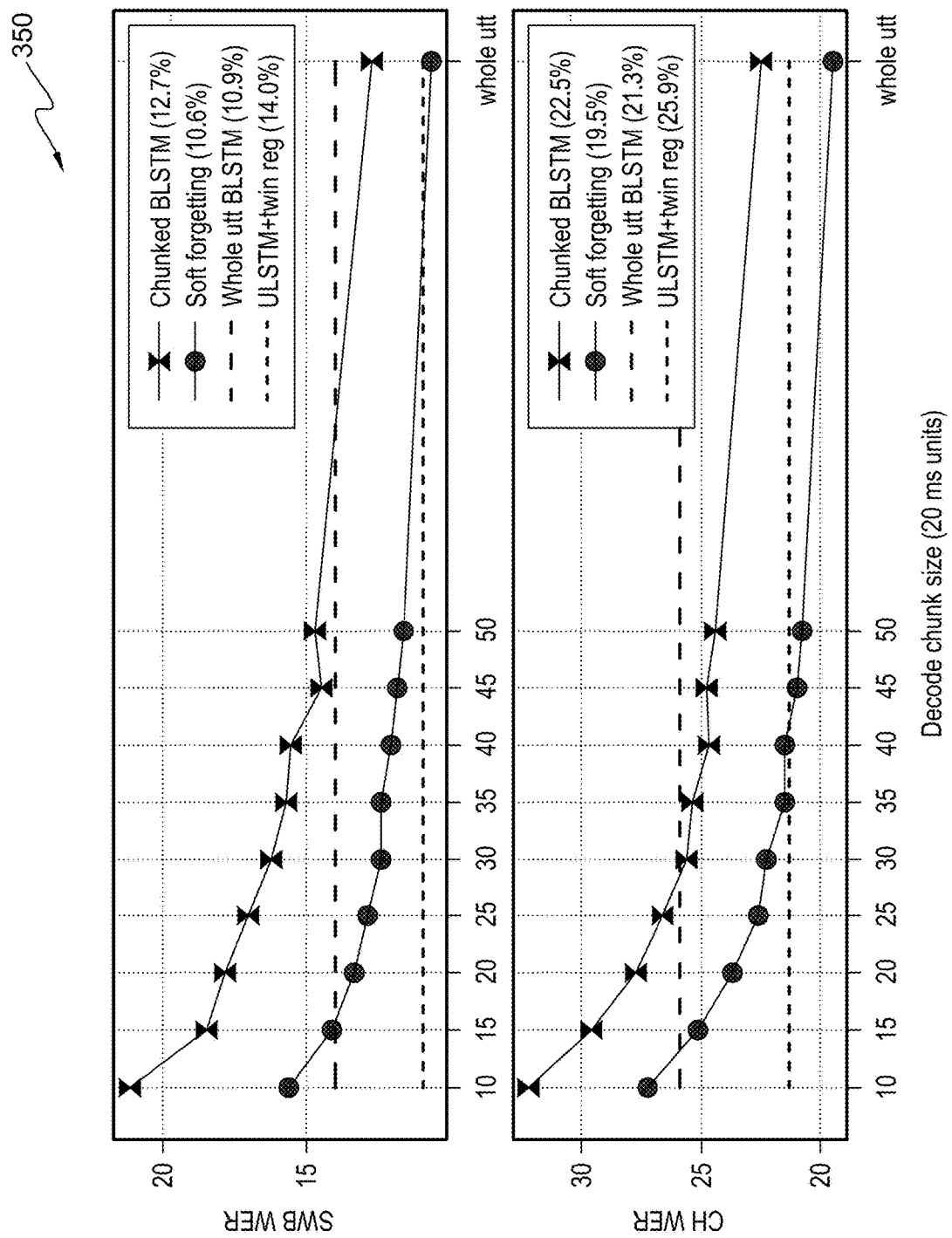
FIG. 3E illustrates exemplary graphs 350, example graphs depicting word error rates for a plurality of models, in accordance with an embodiment of the present invention.

FIG. 3E illustrates exemplary graphs 350, which are graphs depicting word error rates for a plurality of models including a chunk-based BLSTM, soft-forgetting BLSTM, whole-utterance BLSTM, and a ULSTM with twin regularization.

Figure 3F:
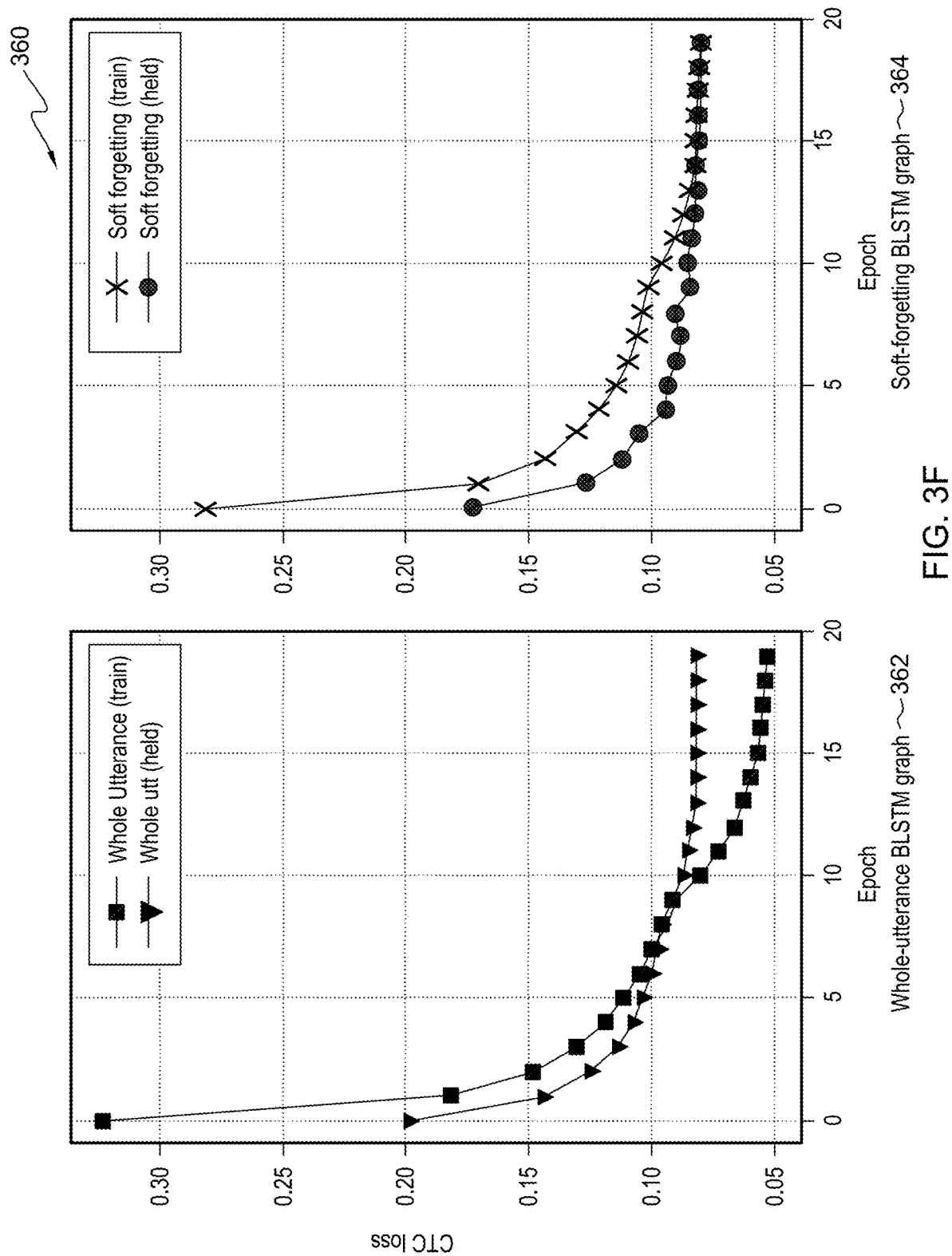
FIG. 3F illustrates exemplary graphs 360, example graphs depicting CTC loss for a whole-utterance BLSTM and a soft-forgetting BLSTM, in accordance with an embodiment of the present invention.

FIG. 3F illustrates exemplary graphs 360, which are graphs demonstrating CTC losses for whole-utterance trained BLSTMs and chunk-based BLSTMs trained utilizing soft-forgetting. Exemplary graphs 360 contains whole-utterance BLSTM graph 362 and soft-forgetting BLSTM graph 364.

FURTHER COMMENTS AND/OR EMBODIMENTS

Some embodiments of the present invention recognize the following facts, potential problems, and/or potential areas for improvement with respect to the current state of the art.

Connectionist temporal classification (CTC)-based automatic speech recognition systems perform well when using bidirectional long short-term memory (BLSTM) networks unrolled over the whole speech utterance. Some embodiments of the present invention recognize that whole-utterance BLSTMs better capture long-term context but lead to overfitting. Embodiments of the present invention propose soft-forgetting as a solution. During training, some embodiments of the present invention unroll the BLSTM only over small non-overlapping chunks of the input utterance. Some embodiments of the present invention randomly pick a chunk size for each batch instead of a fixed global chunk size. In order to retain some utterance-level information, some embodiments of the present invention encourage the hidden states of the BLSTM to approximate those of a pretrained whole-utterance BLSTM. Some embodiments of the present invention, utilizing the 300-hour English Switchboard dataset, show that soft-forgetting improves the word error rate (WER) above a competitive whole-utterance phone CTC BLSTM by an average of 7-9%. Some embodiments of the present invention obtain WERs of 9.1%/17.4% using speaker-independent and 8.7%/16.8% using speaker-adapted models respectively on the Hub5-2000 Switchboard/CallHome test sets. Some embodiments of the present invention recognize that soft-forgetting improves the WER when the model is used with limited temporal context for streaming recognition. Finally, some embodiments of the present invention present empirical insights into the regularization and data augmentation effects of soft-forgetting.

Some embodiments of the present invention recognize that end-to-end (E2E) automatic speech recognition (ASR) systems have been the subject of significant recent research. Such systems aim to simplify the complex training and inference pipelines of conventional hybrid ASR systems. Hybrid systems combine Gaussian mixture models, hidden Markov models (HMMs) and various neural networks and involve multiple stages of model building and alignment between the sequence of speech features and MINI context-dependent states. In contrast, end-to-end systems use recurrent neural networks and train the acoustic model in one-shot by either summing over all alignments through the connectionist temporal classification (CTC) loss or learning the optimal alignment through an attention mechanism. Some embodiments of the present invention recognize the word error rate (WER) gap between E2E and hybrid ASR systems has reduced over time.

Some embodiments of the present invention recognize recurrent neural networks with long short-term memory (LSTM) hidden units are the neural networks of choice for ASR systems. Bidirectional LSTM (BLSTM) networks are especially popular and consist of two LSTM networks at each layer that are unrolled forward and backward in time. For E2E ASR systems, the BLSTM network is unrolled over the entire length of the speech utterance. Whole-utterance unrolling enables a BLSTM to better capture long-term context, which is especially useful given the lack of alignments. The control of remembering long-term context is left to the four trainable gates (input, forget, cell, and output) of the LSTM cell. Some embodiments of the present invention recognize architectural variants of the LSTM cell in order to control this information processing behavior.

Some embodiments of the prevent invention recognize that whole-utterance unrolling of BLSTM leads to overfitting, even in the presence of well-known regularization techniques such as dropout. This is especially detrimental to the WER of E2E ASR systems given limited training data, e.g. a few hundred hours of speech. Some embodiments of the prevent invention utilize soft-forgetting to combat this overfitting. First, some embodiments of the prevent invention unroll the BLSTM only over small non-overlapping chunks of the input acoustic utterance instead of the whole utterance. The hidden and cell states of the forward and backward LSTM networks are reset to zero at chunk boundaries. In order to prevent memorization of the fixed-sized chunk, some embodiments of the prevent invention randomly perturb the chunk size across batches during training. Finally, some embodiments of the prevent invention use twin regularization in order to retain some utterance-level context. Twin regularization adds the mean-squared error between the hidden states of the chunked-BLSTM model and a pre-trained whole-utterance BLSTM model to the CTC loss. Some embodiments of the prevent invention recognize that twin regularization promotes some remembering of context across chunks.

Some embodiments of the present invention have considered chunked-training of CTC ASR models primarily for streaming inference. However, soft-forgetting additionally incorporates chunk jitter and twin regularization, and significantly improves both the offline/non-streaming and streaming WER of the CTC ASR system. Some embodiments of the present invention show that, utilizing the 300-hour English Switchboard data set, soft-forgetting significantly improves the WER by 7-9% relative over a competitive phone CTC baseline across several test sets. Some embodiments of the present invention present empirical evidence for the regularization and data augmentation effects of soft-forgetting.

Some embodiments of the present invention recognize that ULSTM networks lag BLSTM networks in terms of ASR WER because ULSTM networks only incorporate forward-in-time context whereas BLSTM networks additionally incorporate backward-in-time context. In its original formulation, twin regularization jointly trains two ULSTM networks operating forward and backward-in-time independently. The overall training loss is:

$$L_{tot}(y|x,\Theta_f,\Theta_b) = L_{CTC\text{-}f}(y|x,\Theta_f) + L_{CTC\text{-}b}(y|x,\Theta_b) + \lambda L_{twin}(h_f,h_b|\Theta_f,\Theta_b) \quad (1)$$

where the twin regularization loss is the mean-squared error between the LSTM hidden representations $h_f$ and $h_b$:

$$L_{twin}(h_f,h_b|\Theta_f,\Theta_b) = \|h_f - h_b\|_2^2 \quad (3)$$

where $\Theta_f$ and $\Theta_b$ denote the parameters of the forward and backward ULSTM networks respectively, x and y are the input acoustic and output label sequences, and $\lambda > 0$ is a scaling factor.

FIG. 3A depicts a block diagram of soft-forgetting containing the following elements:

Chunk-based BLSTM network: Soft-forgetting trains a BLSTM unrolled only over non-overlapping windows of C contiguous time steps of the input acoustic sequence. The intuition behind this choice is that whole-utterance BLSTMs tend to overfit the training data, especially when it is limited. Setting the hidden and cell states to 0 after every C time steps mitigates this over-fitting. Some embodiments of the present invention pick C empirically based on heldout CTC loss.

Chunk size jitter: Some embodiments of the present recognize that perturbing C from one batch to the next improves the generalization performance of the model. Some embodiments of the present invention recognize that adding the jitter has a data augmentation effect. Some embodiments of the present invention jitter the chunk size $C_{batch}$ of each batch as follows: $C_{batch} = C + u$, where $u = U(A, A)$ is a uniformly-distributed discrete random variable over [A, A]. Some embodiments of the present invention pick A empirically based on heldout CTC loss.

Twin regularization: In order to incorporate some utterance-level context, some embodiments of the present invention add a twin regularization loss in addition to the CTC loss. This loss is the mean-squared error between the hidden states of a pre-trained whole-utterance BLSTM network and the chunk-based BLSTM network being currently trained. Some embodiments of the present invention keep the weights of the whole-utterance BLSTM weight fixed during training in contrast to the original formulation of twin regularization where both the models are jointly trained.

Hence, the overall loss function for soft-forgetting is:

$$L_{tot}(y|x,\Theta) = L_{CTC}(y|x,\Theta) + \lambda L_{twin}(h,h_{whole}|\Theta) \quad (2)$$

Setting $\lambda = 0$ results in hard forgetting where hidden or cell state information is not transferred across chunks. Some embodiments of the present invention recognize that a non-zero value of $\lambda$ yields significantly better WER compared to $\lambda = 0$, indicating the value of retaining some whole-utterance context through twin regularization.

Some embodiments of the present invention recognize that chunked training of the BLSTM does not require any chunk-wise alignments and only affects the forward pass through the BLSTM network. Some embodiments of the present invention recognize a batch of B utterances with N chunks each as a batch of BN small utterances. Some embodiments of the present invention reshape the resulting chunk-wise posterior vectors to construct the posterior sequence for the original whole utterances and use it to compute the CTC loss. Once the chunk-based BLSTM network is trained using soft-forgetting, some embodiments of the present invention discard the whole-utterance BLSTM network and perform inference without any modification.

Some embodiments of the present invention utilized the 300-hour English Switchboard task to train both speaker independent (SI) and speaker adapted (SA) models. The SI models utilize 40-dimensional logMel features with a per-speaker cepstral mean subtraction (CMS) and without any vocal tract length normalization (VTLN). The SA models utilize 40-dimensional logMel features with per-speaker CMS and VTLN, 40-dimensional feature-space maximum likelihood linear regression (FMLLR) features, and 100-dimensional i-vectors, similar to a feature fusion system.

Some embodiments of the present invention train a plurality of 6-layer BLSTM networks in PyTorch with 512 hidden neurons each in the forward and backward directions. The output 1024-dimensional hidden vector maps to a 45-dimensional posterior probability vector representing the 44 phones and the blank symbol through a linear layer and softmax. Some embodiments of the present invention contain models that utilize deltas and double-deltas on the logMel features, and frame stacking and skipping with a rate of 2 for the logMel and FMLLR features. This results in 240-dimensional input acoustic features for the SI models and 420-dimensional input acoustic features for the SA models. The 4-gm LM trains on all text from the SWB+Fisher corpus with a vocabulary of 30k words.

Some embodiments of the present invention train all models using synchronous stochastic gradient descent (SGD) with a learning rate of 0.04, Nesterov momentum of 0.9 and a batch size of 128 over 4 V100 GPUs. The learning rate is multiplied by 0.5 per epoch after the first 10 epochs. Some embodiments of the present invention also utilize sequence noise injection on the logMel features for both the SI and SA models. Sequence noise injection performs log-sum-exp on the logMel features sequences of the current utterance and a randomly-sampled utterance from the training set which regularizes the model and can be also thought of as on-the-fly data augmentation since it creates new input feature sequences. There are two hyper-parameters: weight on the features of the randomly-sampled utterance and the probability of injecting sequence noise. Some embodiments of the present invention used values of (0.4,0.4) for the hyper-parameters for all the SI models and (0.2,0.4) for all the SA models based on heldout CTC loss.

Some embodiments of the present invention delineate various elements of soft-forgetting in steps to gain an understanding the impact said elements have on the WER. First, some embodiments of the present invention train the chunk-based BLSTM model with a fixed chunk size. Some embodiments of the present invention vary the chunk size from 5 to 50 stacked frames (100 msec to 1 sec) in steps of 5 stacked frames. Some embodiments of the present invention demonstrate that based on the heldout CTC loss, the optimal chunk size is 40 stacked frames which shows WERs of 12.7%/22.5% on the Hub5-2000 SWB/CH test sets as shown in FIG. 3B.

Next, some embodiments of the present invention introduced a chunk size jitter of U (2, 2) across training batches which results in a further absolute reduction in WER of 0.6% on SWB and 1.0% on CH. Some embodiments of the present invention recognize that chunk-based BLSTM model with hard forgetting has comparable WER to the whole-utterance BLSTM model without sequence noise injection. Some embodiments of the present invention introduce twin regularization over the last three BLSTM layers and vary $\lambda$ over 0.001, 0.01, 0.1, 1.0. Some embodiments of the present invention recogntize that the best heldout CTC loss at $\lambda=0.01$ which results in a WER of 11.1% on SWB and 19.7% on CH, which is only 0.2% worse than the sequence noise injection baseline on SWB and 1.6% absolute better on CH. Finally, some embodiments of the present invention introduce sequence noise injection, yielding a WER of 10.6% on SWB and 19.5% on CH. The benefit of sequence noise injection is diminished in the presence of soft-forgetting because both techniques have the same effect of regularizing the model and performing on-the-fly data augmentation.

Some embodiments of the present invention perform a grid search by jointly varying chunk size over 5, 10, . . . , 50 and chunk jitter over 1, 2, . . . , 10 on the best model including twin regularization and sequence noise. Some embodiments of the present invention demonstrate that most values of chunk size 20 and chunk jitter 6 yield almost equally low heldout losses. Responsive to picking the optimal chunk size of 40 and chunk jitter of 10, some embodiments of the present invention recognize only a minor improvement of 0.2% in the CH WER and no improvement on SWB.

Next, some embodiments of the present invention apply the soft-forgetting recipe to the SA model. FIG. 3C shows the result of the baseline CTC model and the model with soft-forgetting across five test sets. Some embodiments of the present invention recognize that soft-forgetting obtains 0.9% and 1.6% absolute improvements over the baseline SA model for the SWB and CH test sets. For reference, some embodiments of the present invention also show the WERs of the SI models from FIG. 3B. Soft-forgetting improves the average WER for the SI model by 1.3% absolute and the SA model by 1.4% absolute. Some embodiments of the present invention then perform state-level minimum Bayes risk (sMBR) sequence training of these models and perform rescoring of the resulting lattices with a LSTM language model (NNLM) trained on the Fisher+SWB corpus. The embedding layer of the NNLM has 512 nodes, followed by 2 LSTM layers, each having 2048 nodes. Before the softmax-based estimation of the 30k-dimensional word posterior vector, the feature space is reduced to 128 by a linear bottleneck layer. Some embodiments of the present invention use a combination of DropConnect and Dropout to regularize the model. Some embodiments of the present invention train utilizing SGD with an initial learning rate of 0.01 and Nesterov momentum of 0.9. After 20 epochs of training, the learning rate was annealed by a factor of 0.5 in 15 steps. Some embodiments of the present invention obtain final WERs of 9.6%/17.7% for the SI and 8.7%/16.8% for the SA phone CTC models with soft-forgetting.

In order to gauge the performance of the phone CTC models with soft-forgetting, some embodiments of the present invention show the WERs of various models from the literature on the Hub5-2000 SWB and CH test sets in FIG. 3D. Some embodiments of the present invention perform data augmentation using speed perturbation (0.9×, 1×, and 1.1×) for our SI system to be able to compare it to other systems using data augmentation. Speed perturbation further improves the SI system to 9.1%/17.4%. Some embodiments of the present invention recognize that said models compare favorably to all the end-to-end systems. The WER improvement is especially large on the more challenging CH test set. Soft-forgetting also significantly helps to reduce the WER gap between the phone CTC and the SA hybrid BLSTM model with feature fusion that uses a complex multi-stage training pipeline and 32k CD states as output. Specifically, some embodiments of the present invention reduce the WER gap between the SA hybrid BLSTM and the phone CTC by 71% for SWB and 74% for CH compared to models that used only sequence noise injection.

Some embodiments of the present invention utilize the SI and SA models before sMBR and NNLM rescoring for decoding with limited latency and similarly can be drawn using the SA models. These embodiments unroll the BLSTM model over non-overlapping chunks during inference. The hidden and cell states of the forward LSTM network are copied over from one chunk to the next as it improved the WER. The backward LSTM hidden and cell states are reset to zero.

FIG. 3E shows the WERs of the chunked BLSTM with and without soft-forgetting versus the decoding chunk size. For each choice of decoding chunk size, some embodiments of the present invention report the best WER across all training chunk sizes. For reference, some embodiments of the present invention have also shown the WERs of a whole-utterance BLSTM and a competitive whole-utterance ULSTM model trained with a twin regularization loss using the whole-utterance BLSTM. Some embodiments of the present invention recognize that the chunked BLSTM trained with soft-forgetting significantly improves upon the chunked BLSTM across all decoding chunk sizes.

Some embodiments of the present invention recognize that whole-utterance BLSTM models tend to overfit the data and soft-forgetting is a way to mitigate this. FIG. 3F illustrates the training and heldout CTC losses as training proceeds for the baseline whole-utterance SI BLSTM and the chunked SI BLSTM with soft-forgetting. Some embodiments of the present invention recognize that the converged training and heldout losses for the chunk-based BLSTM with soft-forgetting are significantly closer when compared with the whole-utterance BLSTM indicating that soft-forgetting does indeed regularize the model.

Some embodiments of the present invention recognize that resetting the hidden and cell states of the BLSTM after a random chunk size effectively creates data augmentation. This random forgetting leads to different hidden representations output by the BLSTM for the same input acoustic feature sequence and creates different training samples. Some embodiments of the present invention utilize the best SA BLSTM model with soft-forgetting and forward-pass the Hub5-2000 SWB test set. For each utterance, some embodiments of the present invention unroll the BLSTM over the entire utterance and over chunks of sizes 30, 31, . . . , 50 representing the chunk sizes used in training. Some embodiments of the present invention reset the hidden and cell states to zero after each chunk. Some embodiments of the present invention then computes a 1024-dimensional representation by averaging the output of the final BLSTM layer and projecting it down to 2 dimensions using t-distributed Stochastic Neighbor Embedding (t-SNE). Some embodiments of the present invention recognize that the embeddings show acoustic clustering across utterances, e.g. all utterances with hesitations cluster in one region of the space. More importantly, some embodiments of the present invention recognize that forgetting hidden and cell states after chunks of different sizes perturbs the embeddings in a local neighborhood for each utterance, attributed to the twin regularization loss used during training. The nature of this perturbation is different for each utterance and is not simply an independent and identically-distributed noise, attributed to the highly non-linear nature of the underlying representation. Some embodiments of the present invention recognize that this perturbation is an effective form of data augmentation.

Embodiments of the present utilize soft-forgetting to train better CTC ASR models consisting of three elements, as follows. First, embodiments of the present invention unroll the BLSTM only over non-overlapping chunks of input acoustic frames instead of the whole sequence. The hidden and cell states are hence forgotten from one chunk to the next. Second, embodiments of the present invention perturb the chunk duration across training batches. Finally, embodiments of the present invention recognize that the CTC loss is regularized by promoting hidden representations of the BLSTM to be close to those from a pre-trained whole-utterance BLSTM model. Some embodiments of the present invention demonstrate that soft-forgetting improves the WER by 7-9% relative compared to a competitive phone CTC baseline, and also helps to close the WER gap with a state-of-the-art hybrid BLSTM by around 70%.

Figure 4:
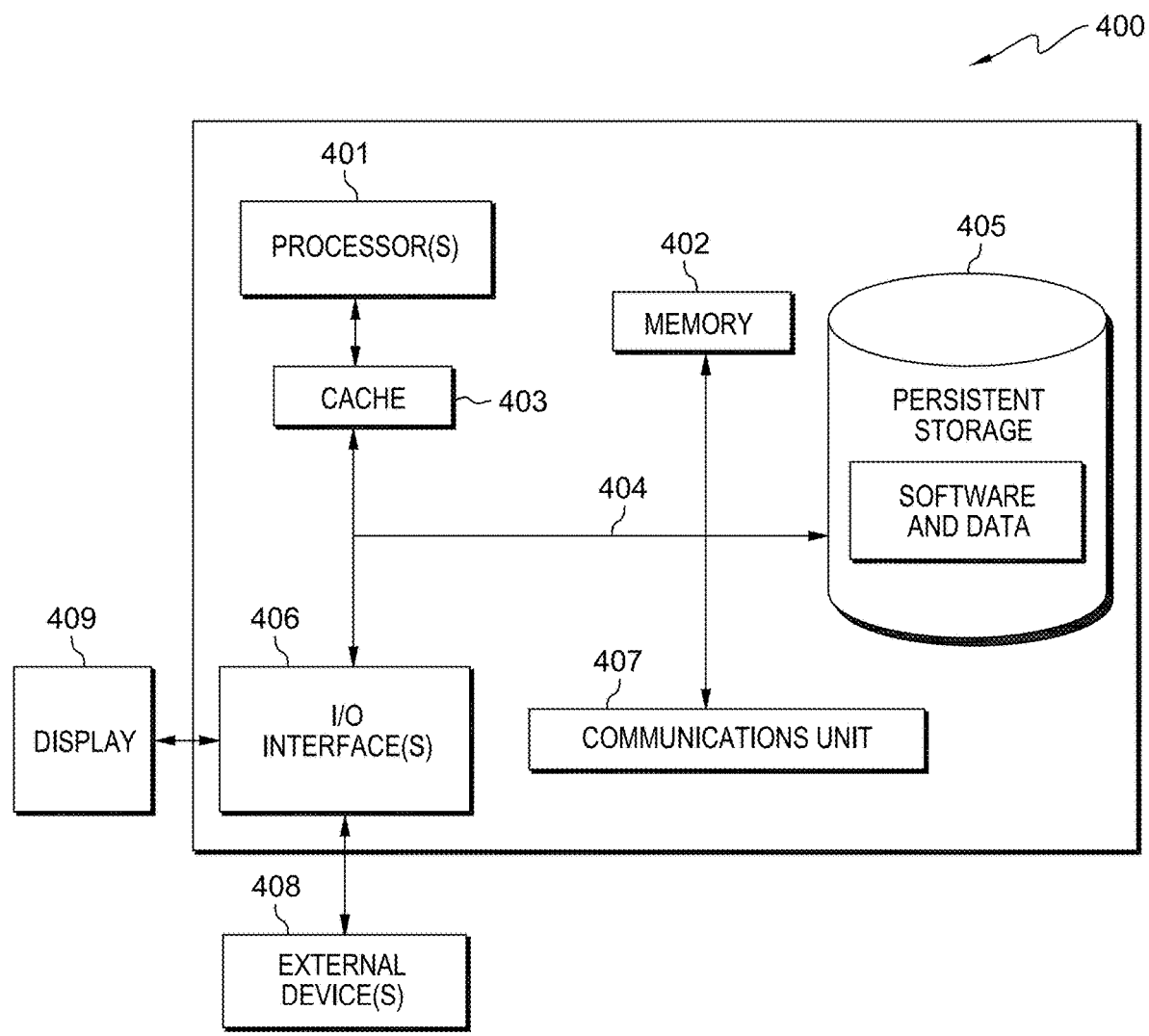
FIG. 4 is a block diagram of components of the server computer, in accordance with an embodiment of the present invention.

FIG. 4 depicts a block diagram of components of server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 120 each include communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to server computer 120. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   training, by one or more computer processors, a first model utilizing one or more training batches wherein each training batch of the one or more training batches comprises one or more acoustic sequences;
   responsive to a completion of the training of the first model, initiating, by one or more computer processors, a training of a second model utilizing the one or more training batches;
   jittering, by one or more computer processors, a random block size for each acoustic sequence for each of the one or more training batches for the second model;
   unrolling, by one or more computer processors, the second model over one or more non-overlapping contiguous jittered acoustic sequences; and responsive to the unrolling of the second model, reducing, by one or computer processors, overfitting for the second model by applying twin regularization.

2. The method of claim 1, wherein the first model is a whole-utterance bidirectional long short-term memory network.

3. The method of claim 1, wherein the second model is a chunk-based bidirectional long short-term memory network.

4. The method of claim 1, wherein the one or more non-overlapping contiguous jittered acoustic sequences are calculated from a connectionist temporal classification loss.

5. The method of claim 1, wherein each acoustic sequence has an associated textual label.

6. The method of claim 1, further comprising:
responsive to a completion of the training of the second model, disposing, by one or more computer processors, the first model; and
responsive to the completion of the training of second model, deploying, by one or more computer processors, the second model to one or more production environments.

7. The method of claim 1, wherein twin regularization comprises a loss value and a connectionist temporal classification loss of the second model, wherein the loss value is a mean-squared error between hidden states of the first model and second model and the first model.

8. A computer program product comprising:
one or more computer readable storage media and program instructions stored on the one or more computer readable storage media, the stored program instructions comprising:
program instructions to train a first model utilizing one or more training batches wherein each training batch of the one or more training batches comprises one or more acoustic sequences;
program instructions to, responsive to a completion of the training of the first model, initiate a training of a second model utilizing the one or more training batches;
program instructions to jitter a random block size for each acoustic sequence for each of the one or more training batches for the second model;
program instructions to unroll the second model over one or more non-overlapping contiguous jittered acoustic sequence; and
program instructions to, responsive to the unrolling of the second model, reduce overfitting for the second model by applying twin regularization.

9. The computer program product of claim 8, wherein the first model is a whole-utterance bidirectional long short-term memory network.

10. The computer program product of claim 8, wherein the second model is a chunk-based bidirectional long short-term memory network.

11. The computer program product of claim 8, wherein the one or more non-overlapping contiguous jittered acoustic sequences are calculated from a connectionist temporal classification loss.

12. The computer program product of claim 8, wherein the program instructions stored on the one or more computer readable storage media comprise:
program instructions to, responsive to a completion of the training of the second model, dispose, by one or more computer processors, the first model; and
program instructions to, responsive to the completion of the training of second model, deploy, by one or more computer processors, the second model to one or more production environments.

13. The computer program product of claim 8, wherein twin regularization comprises a loss value and a connectionist temporal classification loss of the second model, wherein the loss value is a mean-squared error between hidden states of the first model and second model and the first model.

14. A computer system comprising:
one or more computer processors;
one or more computer readable storage media; and
program instructions stored on the computer readable storage media for execution by at least one of the one or more processors, the stored program instructions comprising:
program instructions to train a first model utilizing one or more training batches wherein each training batch of the one or more training batches comprises one or more acoustic sequences;
program instructions to, responsive to a completion of the training of the first model, initiate a training of a second model utilizing the one or more training batches;
program instructions to jitter a random block size for each acoustic sequence for each of the one or more training batches for the second model;
program instructions to unroll the second model over one or more non-overlapping contiguous jittered acoustic sequences; and
program instructions to, responsive to the unrolling of the second model, reduce overfitting for the second model by applying twin regularization.

15. The computer system of claim 14, wherein the first model is a whole-utterance bidirectional long short-term memory network.

16. The computer system of claim 14, wherein the second model is a chunk-based bidirectional long short-term memory network.

17. The computer system of claim 14, wherein the one or more non-overlapping contiguous jittered acoustic sequences are calculated from a connectionist temporal classification loss.

18. The computer system of claim 14, wherein the program instructions stored on the one or more computer readable storage media comprise:
program instructions to, responsive to a completion of the training of the second model, dispose, by one or more computer processors, the first model; and
program instructions to, responsive to the completion of the training of second model, deploy, by one or more computer processors, the second model to one or more production environments.

19. The computer system of claim 14, wherein twin regularization comprises a loss value and a connectionist temporal classification loss of the second model, wherein the loss value is a mean-squared error between hidden states of the first model and second model and the first model.

\* \* \* \* \*